(12) United States Patent  
Shimizu et al.

(10) Patent No.: US 8,922,171 B2  
(45) Date of Patent: Dec. 30, 2014

(54) NONAQUEOUS ELECTROLYTE SECONDARY BATTERY APPARATUS AND METHOD FOR CHARGING ANODE OF THE SAME

(75) Inventors: Masao Shimizu, Hitachi (JP); Katsunori Nishimura, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 948 days.

(21) Appl. No.: 13/020,180

(22) Filed: Feb. 3, 2011

(65) Prior Publication Data

US 2011/0187330 A1  Aug. 4, 2011

(30) Foreign Application Priority Data

Feb. 4, 2010  (JP) ................................ 2010-023435

(51) Int. Cl.
*H02J 7/00* (2006.01)
*H02J 7/04* (2006.01)

(52) U.S. Cl.
CPC ... *H02J 7/00* (2013.01); *H02J 7/04* (2013.01); *Y02E 60/122* (2013.01); *Y02T 10/7011* (2013.01)
USPC .............................. 320/137; 320/128; 429/99

(58) Field of Classification Search
CPC ................................ A61K 45/06; C09K 11/06
USPC ..................................... 320/128, 137
See application file for complete search history.

(56) References Cited

U.S. PATENT DOCUMENTS

| | | | |
|---|---|---|---|
| 5,432,030 A | 7/1995 | Vourlis | |
| 2007/0037049 A1* | 2/2007 | Iijima et al. | 429/99 |
| 2008/0238372 A1* | 10/2008 | Cintra et al. | 320/137 |
| 2009/0291330 A1* | 11/2009 | Onnerud et al. | 429/7 |

FOREIGN PATENT DOCUMENTS

| | | |
|---|---|---|
| JP | 7-254435 | 10/1995 |
| JP | 08-190934 | 7/1996 |
| JP | 10-270090 | 10/1998 |
| JP | 11-031531 | 2/1999 |
| JP | 2010-282732 | 12/2010 |

* cited by examiner

*Primary Examiner* — Edward Tso
*Assistant Examiner* — Johali Torres Ruiz
(74) *Attorney, Agent, or Firm* — Antonelli, Terry, Stout & Kraus, LLP.

(57) ABSTRACT

The present invention suppresses a decrease in the capacity of a lithium ion battery. A polymer forming agent or a sacrificial reducing agent is added to a nonaqueous electrolytic solution. A voltage is then applied to between a battery container and an anode. Thus, lithium ions can be inserted into the anode to recover the capacity of the battery.

6 Claims, 2 Drawing Sheets

NONAQUEOUS ELECTROLYTE SECONDARY BATTERY APPARATUS AND METHOD FOR CHARGING ANODE OF THE SAME

BACKGROUND OF THE INVENTION

1. Field of the Invention

The present invention relates to a nonaqueous electrolyte secondary battery apparatus such as a lithium ion battery and a method for charging an anode of the apparatus.

2. Background Art

Nonaqueous electrolyte secondary batteries typified by lithium ion batteries have high energy densities and are thus gathering much attention as batteries for electric cars. Target electric cars include zero-emission electric cars with no engine mounted therein, hybrid electric cars with both an engine and a secondary battery mounted therein, and plugin electric cars charged directly by a system power source. Furthermore, the nonaqueous electrolyte secondary battery is expected to be used as a stationary power storage apparatus in which power is stored so that power is supplied in an emergency when a power system is shut off.

For such diverse applications, high durability is demanded of the lithium ion battery. That is, the lithium ion battery is desired to undergo only a small decrease in chargeable capacity in spite of an elevated environmental temperature and to maintain a high battery capacity retention ratio over a long period. In particular, the lithium ion battery for electric cars suffers a high temperature environment at 60° C. or higher resulting from radiation heat from a road surface or heat conduction in the car. Thus, the preservation property and cycle life in such a high temperature environment are important required performance for the lithium ion battery for electric cars.

In order to suppress a decrease in capacity or cycle degradation when the battery is left at high temperature, various techniques for obtaining durable electrode materials or electrolytic solutions have been studied. Furthermore, techniques have also been studied in which lithium is inserted into an anode to eliminate the cause of a decrease in capacity. JP Patent Publication (Kokai) No. 10-270090A (1998), JP Patent Publication (Kokai) No. 11-31531A (1999), and JP Patent Publication (Kokai) No. 7-254435A (1995) describe examples in which lithium is inserted into the anode.

SUMMARY OF THE INVENTION

In JP Patent Publication (Kokai) No. 10-270090 (1998), lithium metal is electrically connected to the anode to insert an amount of lithium equivalent to an irreversible capacity into the anode. Furthermore, JP Patent Publication (Kokai) No. 11-31531 (1999) describes the following technique. A lithium electrode is installed outside a group of electrodes. An electrolysis treatment is then carried out to preliminarily charge the anode with metal lithium. This allows the lithium in a cathode to be utilized for charging and discharging with economy. Moreover, JP Patent Publication (Kokai) No. 7-254435 (1995) describes a technique for oxidation-decomposing lithium oxalate added to an electrolytic solution, on the cathode to insert lithium ions into the anode.

In the conventionally proposed techniques for inserting lithium into the anode of the lithium ion battery as described above, the electrolysis treatment of the lithium metal provided separately from the group of electrodes or the oxidation reaction of lithium oxalate is utilized to migrate lithium ions into the anode. Moreover, unused lithium may cause the anode to be overcharged. Hence, the techniques remain to be improved in terms of materials or facilities.

If for example, the nonaqueous electrolyte secondary battery such as the lithium ion battery is left in a high temperature environment, chemical species (metal or ions contributing to charging and discharging reaction) precipitated in the cathode or anode or occluded inside these electrodes are consumed by inactivation reaction with the electrolytic solution and the like. At this time, the capacity of the battery which cannot be recharged (this corresponds to the amount of a decrease in battery capacity) increases. In particular, if the anode has a low potential, the chemical species are consumed by the inactivation reaction with the electrolytic solution, thus reducing the capacity of the battery. The chemical species include alkali metal other than lithium, alkali earth metal, or any other type of metal.

The present invention has been developed in view of the above-described circumstances. An object of the present invention is to provide a nonaqueous electrolyte secondary battery which allows chemical species contributing to charging and discharging of the nonaqueous electrolyte secondary battery to be resupplied to the anode, allowing the reduced capacity to be recovered to the original value.

As a result of dedicated examinations for accomplishing the above-described object, the present inventors have gained the following knowledge. In a lithium ion battery including a cathode, an anode, and a container configured to include the cathode and the anode, when a voltage is applied to between the container and the anode, oxidation reaction occurs in the container. In the anode, lithium insertion reaction (reduction reaction) occurs. Thus, an amount of lithium ions equivalent to an irreversible capacity can be inserted into the anode. The present invention is based on the above-described knowledge.

That is, a first invention is a nonaqueous electrolyte secondary battery apparatus including a cathode, an anode, and a nonaqueous electrolytic solution containing a nonaqueous electrolyte, a cathode terminal being connected to the cathode, an anode terminal being connected to the anode, the cathode terminal and the anode terminal being attached to a battery container via insulating components, wherein the cathode terminal, the anode terminal, and the battery container are connected to a charging circuit via a selector switch, and the charging circuit provides a function to selectively apply a voltage to between the cathode terminal and the anode terminal or between the battery container and the anode terminal via the selector switch.

A second invention is a nonaqueous electrolyte secondary battery apparatus including a cathode, an anode, and a nonaqueous electrolytic solution containing a nonaqueous electrolyte, a cathode terminal being connected to the cathode, an anode terminal being connected to the anode, the cathode terminal and the anode terminal being attached to a battery container via insulating components, wherein a first charging circuit providing a function to apply a voltage to the cathode terminal and the anode terminal is connected to the cathode terminal and the anode terminal, and a second charging circuit providing a function to apply a voltage to the battery container and the anode terminal is connected to the battery container and the anode terminal.

A third invention is the nonaqueous electrolyte secondary battery apparatus according to the second invention wherein the second charging circuit is removable.

A fourth invention is the nonaqueous electrolyte secondary battery apparatus according to the first invention wherein the nonaqueous electrolytic solution contains a sacrificial reducing agent, and the charging circuit enables a voltage equal to or greater than a voltage at which the sacrificial reducing agent is oxidized on the battery container to be applied to between the anode and the battery container.

A fifth invention is the nonaqueous electrolyte secondary battery apparatus according to the second invention wherein the nonaqueous electrolytic solution contains a sacrificial reducing agent, and the second charging circuit enables a voltage equal to or greater than a voltage at which the sacrificial reducing agent is oxidized on the battery container to be applied to between the anode and the battery container.

A sixth invention is the nonaqueous electrolyte secondary battery apparatus according to the fourth and fifth inventions wherein the sacrificial reducing agent that causes oxidation polymerization reaction or gas generation reaction is used as the sacrificial reducing agent.

A seventh invention is a method for charging an anode of a nonaqueous electrolyte secondary battery including a cathode, the anode, and a nonaqueous electrolytic solution containing a nonaqueous electrolyte, a cathode terminal being connected to the cathode, an anode terminal being connected to the anode, the cathode terminal and the anode terminal being attached to a battery container via insulating components, the cathode terminal, the anode terminal, and the battery container being connected to a charging circuit via a selector switch, the charging circuit providing a function to selectively apply a voltage to between the cathode terminal and the anode terminal or between the battery container and the anode terminal via the selector switch, the selector switch carrying out switching to allow the charging circuit to apply the voltage to between the battery container and the anode terminal to charge the anode.

An eighth invention is a method for charging an anode of a nonaqueous electrolyte secondary battery including a cathode, the anode, and a nonaqueous electrolytic solution containing a nonaqueous electrolyte, a cathode terminal being connected to the cathode, an anode terminal being connected to the anode, the cathode terminal and the anode terminal being attached to a battery container via insulating components, the battery including a first charging circuit providing a function to apply a voltage to the cathode terminal and the anode terminal and connected to the cathode terminal and the anode terminal, and a second charging circuit providing a function to apply a voltage to the battery container and the anode terminal and connected to the battery container and the anode terminal, the second charging circuit applying the voltage to between the battery container and the anode terminal to charge the anode.

According to the present invention, addition of a very simple circuit to an apparatus with a nonaqueous electrolyte secondary battery allows easy recovery of the capacity (irreversible capacity) of the nonaqueous electrolyte secondary battery, which has been said to be non-rechargeable.

DESCRIPTION OF SYMBOLS

100 First embodiment of a nonaqueous electrolyte secondary battery according to the present invention,
101 Battery container, 102 Cathode, 103 Anode, 104 Separator, 105 Cathode terminal, 106 Anode terminal, 107 Insulating seal material, 108 Inlet, 109 Power cable, 110 Power cable, 111 Switch, 112 Power cable, 113 Charge and discharge controller, 114 Power cable, 115 Power cable, 116 Power cable, 117 External equipment
200 Second embodiment of a nonaqueous electrolyte secondary battery according to the present invention,
201 Battery container, 202 Cathode, 203 Anode, 204 Separator, 205 Cathode terminal, 206 Anode terminal, 207 Insulating seal material, 208 Inlet, 209 Power cable, 210 Power cable, 211 Switch, 212 Power cable, 213 Charge and discharge controller, 214 Power cable, 215 Power cable, 216 Power cable, 217 External equipment, 218 Connection portion, 219 Power cable, 220 Removable charger, 221 Power cable, 222 Connection portion, 223 Power cable

DETAILED DESCRIPTION OF THE PREFERRED EMBODIMENTS

With reference to the drawings, the present invention will be described based on embodiments thereof. A lithium ion battery will be described below by way of example. However, the present invention is not limited to the lithium ion battery.
[First Embodiment]

Figure 1:
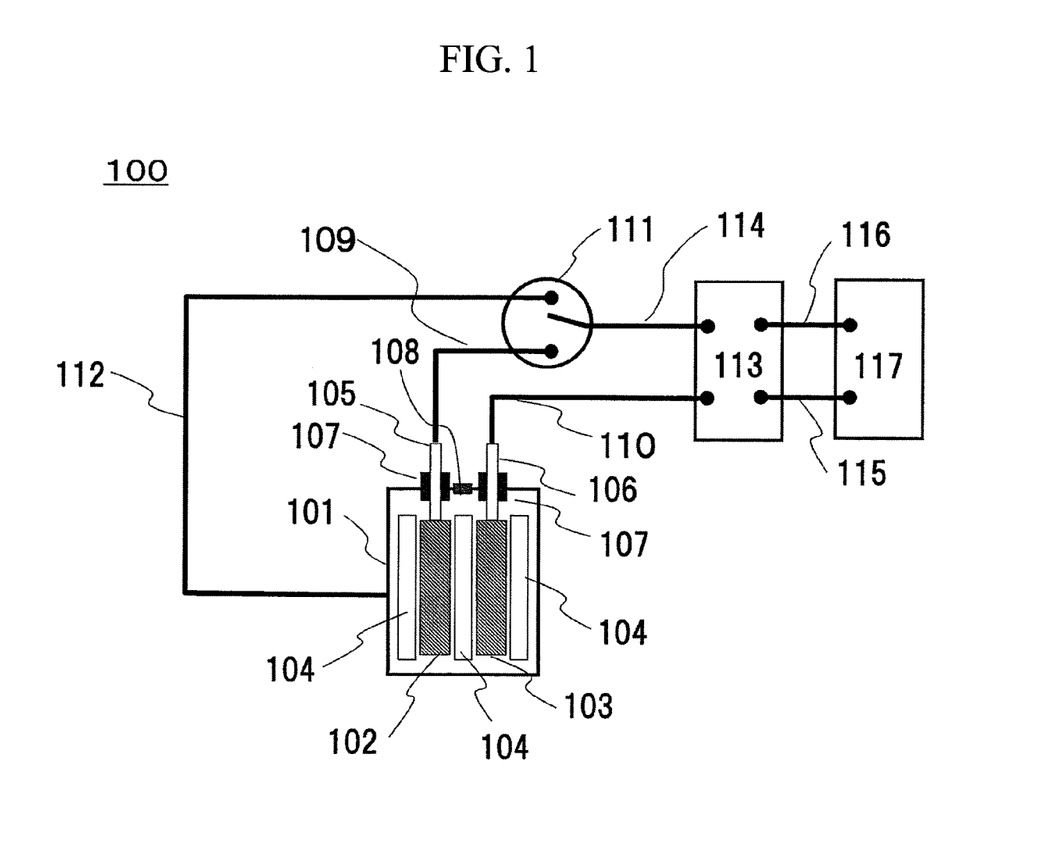
FIG. 1 is a schematic diagram illustrating an embodiment of a nonaqueous electrolyte secondary battery apparatus according to the present invention.

FIG. 1 is a schematic diagram illustrating an example of a nonaqueous electrolyte secondary battery apparatus according to the present invention which is a lithium ion battery.

In an apparatus 100, a lithium ion battery is housed in a battery container 101. A cathode terminal 105, an anode terminal 106, and a battery container 101 are connected to a charge and discharge controller 113 via electric cables 109, 110, 112, and 114 and a switch 111. The charge and discharge controller 113 is connected to external equipment 117 via electric cables 115 and 116.

Now, the components of the lithium ion battery will be described.

The cathode 102 is formed of a cathode active material, a conductive agent, a binder, and a current collector. Typical examples of the cathode active material include $LiCoO_2$, $LiNiO_2$, and $LiMn_2O_4$. Other examples include $LiMnO_3$, $LiMN_2O_3$, $LiMnO_2$, $Li_4Mn_5O_{12}$, $LiMn_{2-x}M_xO_2$ (where, M=Co, Ni, Fe, Cr, Zn, or Ta, x=0.01 to 0.2), $Li_2Mn_3MO_8$, (where, M=Fe, Co, Ni, Cu, or Zn), $Li_{1-x}A_xMn_2O_4$ (where, A=Mg, B, Al, Fe, Co, Ni, Cr, Zn, or Ca, x=0.01 to 0.1), $LiNi_{1-x}M_xO_2$ (where, M=Co, Fe, or Ga, x=0.01 to 0.2), $LiFeO_2$, $Fe_2(SO_4)_3$, $LiCO_{1-x}M_xO_2$ (where, M=Ni, Fe, or Mn, x=0.01 to 0.2), $LiNi_{1-x}M_xO_2$ (where, M=Mn, Fe, Co, Al, Ga, Ca, or Mg, x=0.01 to 0.2), $Fe(MoO_4)_3$, $FeF_3$, $LiFePO_4$, and $LiMnPO_4$. In the present embodiments illustrated below, $LiNi_{1/3}Mn_{1/3}CO_{1/3}O_2$ was used as the cathode active material.

The grain size of the cathode active material is specified to be equal to or smaller than the thickness of a cathode active material. If powder of the cathode active material contains coarse grains with a size equal to or greater than the thickness of the agent combination layer, the coarse grains are pre-removed by sieve classification, wind flow classification, or the like to produce grains with a size equal to or smaller than the thickness of the agent combination layer.

Furthermore, the cathode active material contains oxide and offers high electric resistance. Thus, a conductive material formed of carbon powder is preferably utilized in order to compensate for the electric conductivity of the cathode active material. Since both the cathode active material and the conductive agent are powdery, the powder is mixed with a binder to bind the two types of power together, while bonding the powder to the current collector. In the present embodiments illustrated below, acetylene black (5 wt %) and polyvinylidene fluoride (5 wt %) are added to the above-described cathode active material (90 wt %).

The current collector is formed of an aluminum foil of thickness 10 to 100 μm, an aluminum pored foil of thickness 10 to 100 μm and pore size 0.1 to 10 mm, expanded metal, a foam metal plate, or the like. Examples of applicable materials for the current collector include, in addition to aluminum, stainless steel and titanium. In the present invention, any current collector may be used without limitation of the material or shape of the current collector or a method for manufacturing the current collector. In the present embodiments illustrated below, an aluminum foil of thickness 20 μm was used.

The cathode can be produced by attaching cathode slurry formed of a mixture of the cathode active material, the conductive agent, the binder, and an organic solvent to the current collector by a doctor blade method, a dipping method, a spray method, or the like, drying the organic solvent, and then pressure-forming the cathode using a roll press. Furthermore, a plurality of agent combination can be stacked on the current collector by carrying out the process from coating to drying a number of times.

The anode 103 includes an anode active material, a binder, and a current collector. If high-rate charging and discharging is required, a conductive agent may be added to the anode 103. Examples of available anode active materials include metal or an alloy selected from aluminum, silicon, tin, indium, gallium, and magnesium each of which is alloyed with lithium. Other examples include oxides of 14 or 15 group elements expressed as $SnO$, $GeO_2$, $SnSiO_3$, $SnSi_{0.5}O_{1.5}$, $SnSi_{0.7}Al_{0.1}B_{0.3}P_{0.2}O_{3.5}$, $SnSi_{0.5}Al_{0.3}B_{0.3}P_{0.5}O_{4.15}$, indium oxide, zinc oxide, $Li_3FeN_2$, and silicides expressed as $Fe_2Si_2$, $FeSi$, $FeSi_2$, and $Mg_2Si$.

Other examples of available anode active materials include carbonaceous materials into and from which lithium ions can be electrochemically inserted and released, such as natural graphite, artificial graphite, mesophase carbon, expanded carbon, carbon fiber, vapor deposited carbon fiber, a pitch-containing carbonaceous material, needle cokes, oil cokes, polyacrylonitrile-containing carbon fiber, and carbon black, and amorphous carbon materials obtained by synthesizing cyclic hydrocarbon with a 5- or 6-membered ring or a cyclic oxygen-containing organic compound by thermal decomposition. A mixed anode formed of a material such as graphite, graphitizable carbon, or non-graphitizable carbon, or a mixed or composite anode formed of any of the above-described carbon materials and the above-described metal or alloy poses no problem in implementation of the present invention. In the present invention, the anode active material is not particularly limited, and materials other than those described above can be utilized. The present invention is particularly effective when the anode used contains a carbonaceous material as a main component. Furthermore, a conductive polymer material formed of polyacene, polyparaphenylene, polyaniline, or polyacethylene may be used as an anode.

If the anode active material used is powdery, a binder is mixed into the anode active material to bind the anode active material particles together while bonding the powder to the current collector. In the present embodiments, the grain size of the anode active material is desirably equal to or smaller than the thickness of an agent combination layer. If powder of the anode active material contains coarse grains with a size equal to or greater than the thickness of the agent combination layer, the coarse grains are pre-removed by sieve classification, wind flow classification, or the like to produce grains with a size equal to or smaller than the thickness of the agent combination layer. In the present embodiments illustrated below, polyvinylidene fluoride (10 wt %) was added to graphite (90 wt %) of average grain size 20 μm.

The current collector is formed of a copper foil of thickness 10 to 100 μm, a copper pored foil of thickness 10 to 100 μm and pore size 0.1 to 10 mm, expanded metal, a foam metal plate, or the like. Examples of applicable materials for the current collector include, in addition to copper, stainless steel, titanium, and nickel. In the present invention, any current collector may be used without limitation of the material or shape of the current collector or a method for manufacturing the current collector. In the present embodiments illustrated below, a rolled copper foil of thickness 10 μm was used.

The anode can be produced by attaching anode slurry formed of a mixture of the anode active material, a binder, and an organic solvent to the current collector by the doctor blade method, the dipping method, the spray method, or the like, followed by drying the organic solvent, and then pressure-forming the anode using a roll press. Furthermore, a plurality of agent combination layers can be formed on the current collector by carrying out the process from coating to drying a number of times.

A separator 104 is inserted between the cathode 102 and anode 103 produced as described above to prevent the cathode and the anode from being short-circuited. The separator 104 may be a polyolefin-containing polymer sheet formed of polyethylene or polypropylene or have a multilayer structure in which polyolefin-containing polymer and a fluorine-containing polymer sheet typified by polyethylene tetrafluoride are deposited. To prevent the separator from being contracted when the battery temperature increases, a mixture of ceramics and a binder may be formed on the surface of the separator in the form of a thin film. Such a separator needs to allow lithium ions to pass through when the battery is charged or discharged. Thus, a separator with a pore diameter of 0.01 to 10 μm and a porosity of 20 to 90% can generally be used for lithium ion batteries.

FIG. 1 shows only the configuration of an electrochemical cell including a set of the cathode 102, the separator 104, and the anode 103. However, a plurality of electric cells may be stacked or rolled into a cylindrical or elliptical shape. Such a structure with the separator inserted between the cathode and the anode is hereinafter referred to as an electrode group. The electrode group may have any of various shapes such as a stack of strip electrodes and a roll of electrodes in any shape such as a cylinder or a plane.

The shape of the battery container 101 may be selected from a cylinder, a flat ellipse, a rectangle, and the like in accordance with the shape of the electrode group. The material of the battery container 101 is selected from materials such as aluminum, stainless steel, and nickel-plated steel which resist corrosion by the nonaqueous electrolyte. Furthermore, if the battery container 101 is electrically connected to the cathode or the anode, a material is selected which is prevented from being altered by corrosion of the battery container 101 or alloying with lithium ions, in a portion thereof which is in contact with the nonaqueous electrolyte.

In the present invention, among the above-described materials, aluminum or an aluminum material is preferable because the anode can be charged utilizing formation of an oxide layer of this material. Furthermore, the aluminum or the like more desirably has a surface area increased by roughening the surface thereof. Another preferable method is to install a mesh of the aluminum or its alloy on the inner wall of the battery container 101 so as to be oxidized when a voltage is applied to the battery container 101.

The electrode group is housed in the battery container 101. The cathode terminal 105 and the anode terminal 106 are connected to the battery container 101 or a cover (In FIG. 1, the container 101 and the top cover are integrally drawn). An electrolytic solution is injected into the electrode group. The electrolytic solution is fed through an inlet 108. The electrolytic solution may be injected by adding the electrolytic solution directly to the electrode group with the cover open or adding the electrolytic solution through the inlet installed in the cover. The electrolytic solution may be added by dropping an amount of electrolytic solution metered with a syringe onto the battery or injecting a specified amount of electrolytic solution from a micro metering pump into the battery through a micro tube. The amount of electrolytic solution added to the battery can be managed based on the value of the varying weight of the battery measured using electronic scales.

After the electrolytic solution is injected, the inlet 108 is sealed off by a well-known sealing method such as caulking, screwing, or welding to prevent air from entering the battery.

Typical examples of electrolytic solutions available for the present invention include an ester carbonate solvent such as ethylene carbonate or dimethyl carbonate into which lithium hexafluorophosphate ($LiPF_6$) or lithium borofluoride ($LiBF_4$) is dissolved as an electrolyte. The present invention is not limited by the type of the solvent or the electrolyte or the mixture ratio of the solvent. Any other electrolytic solution is available.

Examples of solvents available for the electrolytic solution include nonaqueous solvents such as propylene carbonate, ethylene carbonate, butylene carbonate, vinylene carbonate, γ-butyrolactone, dimethyl carbonate, diethyl carbonate, methylethyl carbonate, 1,2-dimethoxyethane, 2-methyltetrahydrofuran, dimethyl sulfoxide, 1,3-dioxolan, formamide, dimethylformamide, methyl propionate, ethyl propionate, phosphate triester, trimethoxymethane, dioxolan, dimethyl ether, sulfolane, 3-methyl-2-oxazolidinone, tetrahydrofuran, 1,2-diethoxyethane, chloroethylene carbonate, and chloropropylene carbonate. Any other solvent may be used provided that the solvent is prevented from being decomposed on the cathode or anode built into the battery according to the present invention.

Furthermore, examples of the electrolyte include many types of lithium salt expressed by chemical formulae $LiPF_6$, $LiBF_4$, $LiClO_4$, $LiCF_3SO_3$, $LiCF_3CO_2$, $LiAsF_6$, and $LiSbF_6$ and lithium imide salt typified by lithium trifluoromethane sulfonimide. Any of these types of salt is dissolved into any of the above-described solvents to obtain a nonaqueous electrolytic solution that can be used for batteries. Any other electrolyte may be used provided that the electrolyte is prevented from being decomposed on the cathode or anode built into the battery according to the present invention.

If a solid polymer electrolyte is used, ethylene oxide, acrylonitrile, polyvinylidene fluoride, methyl methacrylate, or an ion conductive polymer such as polyethylene oxide including hexafluoropropylene may be used as an electrolyte. The use of any of these solid polymer electrolytes has the advantage of eliminating the need for the above-described separator.

Moreover, an ionic liquid may be used. For example, a combination that is not decomposed on the cathode or the anode may be selected from, for example, 1-ethyl-3-methylimidazoliumtetrafluoroborate ($EMI-BF_4$), a mixed complex of lithium salt $LiN(SO_2CF_3)_2$ (LiTFSI) and triglyme and tetraglyme, and cyclic quaternary ammonium-containing cations (for example, N-methyl-N-propylpyrrolidinium) and imide-containing anions (for example, bis(fluorosulfonyl) imide) and used for the nonaqueous electrolyte secondary battery apparatus according to the present invention.

The inlet 108 may include a mechanism configured to allow the gas inside the battery to escape to the outside when the internal pressure of the battery container 101 increases. The inlet 108 may have a well-known structure such as a cleavage valve or a check valve.

An insulating seal material 107 is inserted between the battery container 101 (or the top cover of the battery container) and each of the cathode terminal 105 and the anode terminal 106 to prevent electricity from flowing between the cathode terminal 105 and the anode terminal 106 and the battery container 101. Any material such as a glass hermetic seal material or a thermosetting resin may be selected as the insulating seal material 107 provided that the material avoids being swollen or dissolved in the electrolytic solution or softened or damaged in an environmental temperature in which the battery is used and prevents the air from entering the battery container 101.

The cathode terminal 105 of the lithium ion battery is connected to the switch 111 via an electric cable 109. Moreover, the cathode terminal 105 communicates with the charge and discharge controller 113 via an electric cable 114. The anode terminal 106 is connected to the charge and discharge controller 113 via an electric cable 110.

The charge and discharge controller 113 transmits and receives power to and from the externally installed equipment (hereinafter referred to as the external equipment) 117 via power cables 115 and 116. In FIG. 1, the external equipment includes an external power source configured to feed power to the charge and discharge controller 113, various types of electric equipment such as a regenerative motor, and an inverter, a converter, and a load to which the lithium ion battery supplies power. The inverter and the like may be provided depending on whether the external equipment deals with direct current or alternating current. As the above-described equipment, well-known types may be optionally applied.

In the configuration shown in FIG. 1, the lithium ion battery can be charged and discharged by controlling the switch 111 so that the power cables 109 and 114 are coupled together.

When the battery capacity decreases and needs to be recovered, a voltage is applied to between the battery container 101 and the anode 103 to recover the capacity of the battery. A procedure for the recovery will be described below in detail.

First, the switch 111 is actuated to couple the power cables 112 and 114 together. This allows the charge and discharge controller 113 to apply a voltage to between the battery container 101 and the anode 103.

Based on the potential of the anode, the charge and discharge controller 113 controls the voltage of the battery container 101 to a potential at which the electrolytic solution (or a sacrificial reducing agent described below) is decomposed on the inner wall of the battery container 101. The voltage of the battery container 101 is normally set to a value greater than the potential of the cathode 102. That is, the voltage obtained by the control by the charge and discharge controller 113 is higher than the voltage between the cathode terminal 105 and anode terminal 106 of the lithium ion battery.

A specific example of refresh charging of the battery carried out by the charge and discharge controller 113 will be described in detail in embodiments described below. Here, the basic concept of the control according to the present invention will be described.

The charge and discharge controller 113 measures a current flowing after the application of the voltage and obtains an integral value with time (the amount of electricity). The capacity to which the anode is charged is determined from the value obtained. To determine the amount of electricity, a microcomputer with a calculation function may be installed inside the charge and discharge controller 113. The amount of electricity Qref to be charged into the anode is equal to or smaller than the difference between an initial battery capacity Qint and a reduced battery capacity Qtdc measured before refreshing (Expression 1). The value of the right side of the expression corresponds to the maximum chargeable amount obtained when no irreversible decrease has occurred in the capacities of the cathode 102 and the anode 103.

$$Qref \leq Qint - Qtdc \quad \text{(Expression 1)}$$

When an irreversible decrease in capacity has occurred, the decrease needs to be taken into account. In the lithium ion battery, such an irreversible decrease in capacity often occurs. Thus, in a practical sense, the charge amount is controlled using Expression 2 or Expression 3 described below.

Here, it is assumed that the decrease involved in the capacity Qtdc is dominated by the self discharge amount of the anode. Then, the Qtdc includes a decrease in the capacity of the anode which can be compensated for by recharging and a decrease in the capacity of the anode resulting from irreversible capacity decrease reaction. If a Qadc is known, the value Qadc may be subtracted from the initial battery capacity Qint (Expression 2). The rechargeable capacity of the anode is charged by refresh charging according to the present invention.

$$Qref \leq Qint - Qadc \quad \text{(Expression 2)}$$

If the decrease in capacity (that is Qcdc) resulting from the irreversible decrease reaction on the cathode is nonnegligible compared to the capacity decrease amount Qadc of the anode, the capacity decrease amount Qcdc of the cathode needs to be taken into account (Expression 3). In this case, the calculated values of the right sides of Expression 2 and Expression 3 are determined and compared with each other in terms of magnitude. Then, the expression resulting in a smaller value is used. That is, when the Qadc is greater than the Qcdc, Expression 2 is used. When the Qadc is smaller than the Qcdc, Expression 3 is used. If both are the same, either of the expressions may be used.

$$Qref \leq Qint - Qcdc \quad \text{(Expression 3)}$$

The Qcdc can be determined by assembling a model battery formed of a cathode and lithium metal and carrying out self-discharge measurement experiments using the model battery. That is, the model cell with the cathode charged is left at the same environmental temperature as that at which the actual lithium ion battery is left. After any time elapses, the remaining capacity of the cathode is measured. Then, the self-discharge speed (or self-discharge current) of the cathode can be determined by dividing the difference between the initial charge capacity and the remaining capacity by the elapsed time. Then, the self-discharge amount Qcdc of the cathode at the elapsed time can be calculated by integrating the self-discharged speeds over the elapsed time.

The Qadc and Qcdc depend on charge and discharge conditions such as an external temperature, a charge and discharge current, and the duration for which the model cell is left. Thus, the measured values of the Qadc and Qcdc may be determined for each of these conditions and recorded in the microcomputer in the charge and discharge controller 113. The self-discharge speed of each of the anode and the cathode can be measured by the same experiments as those described above. The self-discharge amount Qadc of the anode and the self-discharge amount Qcdc of the cathode at a particular elapsed time can be calculated by integrating the self-discharged speeds of the each of the anode and the cathode over the elapsed time. Corresponding calculation programs are loaded into the charge and discharge controller 113 to control the refresh charging.

A possible more desirable method is to measure the profile of an inter-terminal voltage in the lithium ion battery (data such as the discharge capacity and inter-terminal voltage, or the charge capacity and inter-terminal voltage) and carry out an algorithm process using the amount of change in the profile to improve the accuracy of the predicted values of the Qadc and Qcdc.

The thus controlled refresh charging may be ended when the measured value such as the time required for the refresh charging, the amount of electricity conducting through the battery during the refresh charging, or the battery temperature reaches a specified value. The charge conditions are set so as to prevent the anode from being overcharged.

Furthermore, the difference between the potentials of the cathode and the anode can be monitored by connecting potential measurement lines to the respective potentials and to the charge and discharge controller 113. This is because no current is passed through the cathode during the refresh charging, allowing the cathode to function as a stable reference electrode. The refresh charging is desirably ended when the anode potential measured with reference to the cathode potential is less than a specified value. This is because overcharging of the anode can be avoided.

The electrolytic solution contains carbonate or any other nonaqueous solvent. If a polymer electrolyte is used, a nonaqueous solvent or electrolyte is contained in or an ion liquid is added to the electrolytic solution so that the electrolytic solution can react in the battery container 101.

Alternatively, a polymer agent for oxidation polymerization or a sacrificial reducing agent such as lithium iodate or lithium oxalate may be added to the electrolytic solution.

The polymer agent coats the surface of the battery container 101 through oxidation reaction. However, the polymer agent is not eluted into the electrolytic solution and does not change the normal charge and discharge capacity after the refresh charging. A coated polymer layer is selected which is porous so that the polymer agent can easily permeate the polymer layer. However, even if the permeability of the polymer agent is too low to allow a large current to flow, this is not an essential bottleneck in implementation of the present invention provided that the polymer agent serves to extend the refresh time.

The sacrificial reducing agent generates gas as a result of oxidation decomposition. A product resulting from the generation of the gas needs to avoid reducing the charge and discharge capacity even though the product remains in the battery.

The lithium iodate generates iodine gas and lithium ions. Oxygen of the lithium iodate is consumed by an oxide film in the battery container 101. The iodine gas is released to the outside of the battery container 101. However, the generated iodine gas need not completely be removed because even if a slight amount of iodine gas remains in the electrolytic solution, the gas forms a stable coat containing iodine on the anode.

The lithium oxalate becomes carbon dioxide and lithium ions. The carbon dioxide is released to the outside of the battery container 101. However, even if a slight amount of carbon dioxide remains in the electrolytic solution, the carbon dioxide may form a stable coat on the anode. The coat is particularly effective when the anode contains metal lithium or lithium alloy.

Moreover, the sacrificial reducing agent is desirably a substance that releases lithium ions into the electrolytic solution as a result of oxidation. When the sacrificial reducing agent is oxidized, lithium is inserted into the anode to reduce the concentration of lithium ions in the electrolytic solution. The initial ion concentration needs to be recovered.

Even if the sacrificial reducing agent used fails to release lithium ions, the above-described concentration decrease problem can be solved by feeding an electrolyte or an electrolytic solution through the inlet 108 to recover the initial lithium ion concentration.

When gas is generated in the battery container 101, the whole battery is housed in a vessel filled with inert gas. The gas is then released to the outside. The inert gas may be blown against the vicinity of the inlet 108 to prevent the oxygen in the air from entering the battery. Gas such as nitrogen, argon, or helium may be selected as the inert gas, or any other gas that fails to react with the electrolytic solution may be selected. Furthermore, the inert gas is desirably dry. This is because some electrolytes such as $LiPF_6$ react with water and are decomposed. If the metal lithium or lithium alloy is used as the anode, argon or helium is desirably used because nitrogen reacts with lithium.

Alternatively, with the inlet 108 provided at the top of the battery container 101 opened or with a gas-liquid separator connected to the inlet, the gas may be released to the outside so as to avoid contacting the air.

[Second Embodiment]

Figure 2:
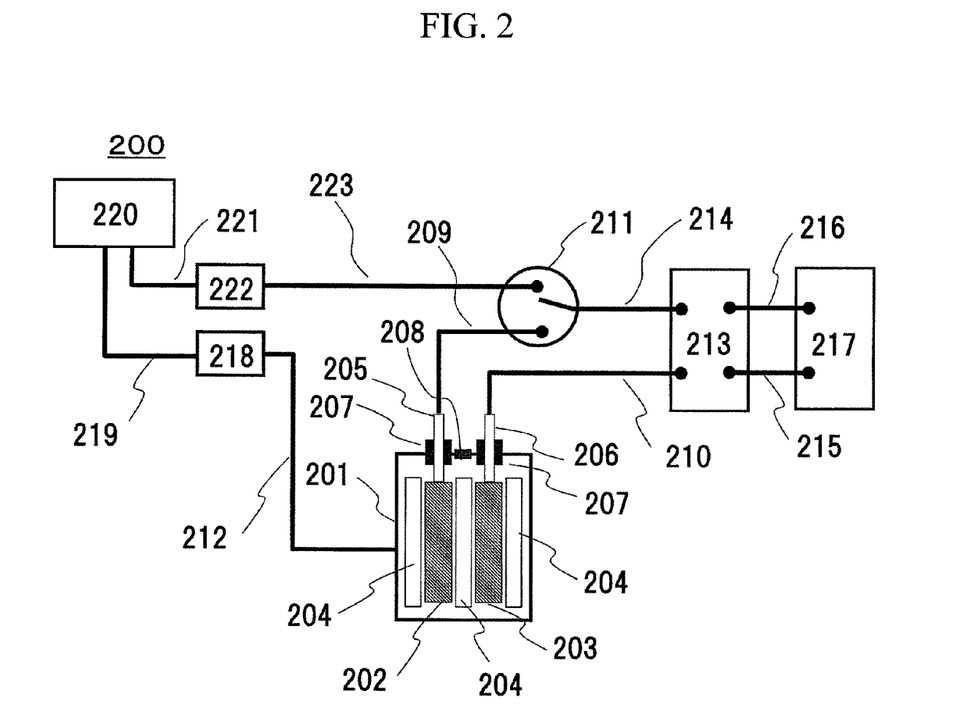
FIG. 2 is a schematic diagram illustrating another embodiment of a nonaqueous electrolyte secondary battery apparatus according to the present invention.

FIG. 2 is a schematic diagram illustrating another embodiment of a nonaqueous electrolyte secondary battery apparatus 200 according to the present invention. Here, a removable charger 220 that charges an anode 203 and a battery container 201 is configured to be removable. In FIG. 2, members corresponding to those of the apparatus 100 shown in FIG. 1 are denoted by numbers in the 200s.

FIG. 2 shows only the configuration of an electrochemical cell including a set of a cathode 202, a separator 104, and the anode 203. However, a plurality of electric cells may be stacked or rolled into a cylindrical or elliptical shape. Such a structure with the separator inserted between the cathode and the anode is hereinafter referred to as an electrode group. The electrode group may have any of various shapes such as a stack of strip electrodes and a roll of electrodes in any shape such as a cylinder or a plane. The shape of the battery container 201 may be selected in accordance with the shape of the electrode group; examples of the selected shape include a cylinder, a flat oval, and a square.

The material of the battery container 201 may be any one of those listed in the description of FIG. 1 or those the surface of which is roughened.

The electrode group is housed in the battery container 201. A cathode terminal 205 and an anode terminal 206 are connected to the battery container 201 or a cover (In FIG. 2, the container 201 and the top cover are integrally drawn). An electrolytic solution is injected into the electrode group. The electrolytic solution is fed through an inlet 208. A method for injecting the electrolytic solution, the structure of the inlet 208, and a method for sealing the inlet 208 have been described for FIG. 1.

Typical examples of electrolytic solutions available for the present invention include a solution obtained by dissolving lithium hexafluorophosphate ($LiPF_6$) or lithium borofluoride ($LiBF_4$), serving as an electrolyte, into a solvent containing ethylene carbonate mixed with dimethyl carbonate, diethyl carbonate, ethylmethyl carbonate, or the like. The present invention is not limited to these electrolytic solutions as is the case with the apparatus in FIG. 1.

The inlet 208 may include a mechanism configured to allow the gas inside the battery to escape to the outside when the internal pressure of the battery container 201 increases. The inlet 208 may have a well-known structure such as a cleavage valve or a check valve.

An insulating seal material 207 is inserted between the battery container 201 (or the top cover of the battery container) and each of the cathode terminal 205 and the anode terminal 206 to prevent electricity from flowing between the cathode terminal 205 and the anode terminal 206 and the battery container 201. The material that can be selected as the insulating seal material 207 and the requirement specifications for the insulating seal material 207 are as described for FIG. 1.

The cathode terminal 205 of the lithium ion battery is connected to a switch 211 via an electric cable 209. Moreover, the cathode terminal 205 communicates with a charge and discharge controller 213 via an electric cable 214. The anode terminal 206 is connected to the charge and discharge controller 213 via an electric cable 210.

The charge and discharge controller 213 transmits and receives power to and from the externally installed equipment (hereinafter referred to as the external equipment) 217 via power cables 215 and 216. In FIG. 2, the external equipment includes an external power source configured to feed power to the charge and discharge controller 213, various types of electric equipment such as a regenerative motor, and an inverter, a converter, and a load to which the lithium ion battery supplies power. The inverter and the like may be provided depending on whether the external equipment deals with direct current or alternating current. As the above-described equipment, well-known types may be optionally applied.

In the configuration shown in FIG. 2, the lithium ion battery can be charged and discharged by controlling the switch 211 so that the power cables 209 and 214 are coupled to the power cable 210; in this case, the configuration may be the same as that shown in FIG. 1.

When the battery capacity decreases and needs to be recovered, a voltage is applied to between the battery container 201 and the anode 203 to recover the capacity of the battery. In the present embodiment, a removable charger 220 is used via connection portions 218 and 220. A procedure for the recovery will be described below in detail.

First, the switch 211 is actuated to couple power cables 212, 219, 221, and 223 to the power cable 214. In synchronism with this coupling operation, a short-circuit loop is formed in the charge and discharge controller 213 such that the input terminal of the power cable 214 is connected to the input terminal of the power cable 210. This serves to prevent possible power loss inside the charge and discharge controller 213. Thus, the removable charger 220 can operate in conjunction with the operation of the switch 211 to apply a voltage to between the battery container 201 and the anode 203.

Based on the potential of the anode, the removable charger 220 increases the voltage to a potential at which the electrolytic solution or a sacrificial reducing agent is decomposed on the inner wall of the battery container 201. The voltage is normally set to a value greater than the potential of the cathode 202. That is, the voltage obtained by the control by the removable charger 220 is higher than the voltage between the cathode terminal 205 and anode terminal 206 of the lithium ion battery. Control conditions for the set voltage are defined by Expressions 1, 2, and 3 described above. A method for adding a polymer forming agent or the sacrificial reducing agent to the electrolytic solution is as described for FIG. 1.

A charge control program for a refresh operation in the apparatus 200 is a calculation program based on Expression 1, 2, or 3 described above. The program is pre-loaded into a microcomputer section of the removable charger 220.

In the configuration shown in FIG. 2, the removable charger 220 can be removed from connection portions 218 and 222. The removable charger 220 may be prepared exclusively when a capacity recovery process (refresh charging) is required. This enables a reduction in an installation space for the apparatus 200.

Based on the above description, specific examples are illustrated below to clarify the effects of the present invention. The specific component materials and parts may be changed without departing from the spirits of the present invention. Furthermore, addition of or replacement with any well-known technique is possible provided that the resultant configuration includes components of the present invention.

EXAMPLES

Example 1-1

In the apparatus 100 shown in FIG. 1, an electrolytic solution was prepared by adding an electrolyte $LiPF_6$ to a solvent with ethylene carbonate (hereinafter referred to as EC) and dimethyl carbonate (DMC) mixed together in the volume ratio of 1:1 so that the resultant concentration was 1 mole/liter. In the present example, $LiNi_{1/3}Mn_{1/3}CO_{1/3}O_2$ was used as a cathode active material. Artificial graphite with an average grain size of 20 μm was used as an anode active material.

Furthermore, cyclohexylbenzene was pre-dissolved into the electrolytic solution. The electrolytic solution with the cyclohexylbenzene was injected through the inlet 108. The inlet 108 was then sealed off. The cyclohexylbenzene is one of the sacrificial reducing agents according to the present invention. In the present example, no gas is generated, and thus no problem occurs even when the inlet 108 is closed.

The inlet 108 has a highly airtight structure in which a metal packing is interposed between two flanges with pointed projection portions and screwed such that the projection portions cut into the metal packing, thus achieving airtightness. This structure allows the original airtightness to be recovered even when the inlet is opened. However, the use of a different structure does not prevent the effects of the present invention from being exerted.

The amount of cyclohexylbenzene added corresponded to a mole number equal to the amount of a decrease in battery capacity (in coulombs) divided by the Faraday constant. It is expected that in an oxidation current resulting from cyclohexylbenzene, several electrons migrate per mole. Thus, reducing the amount to half to one-fifth of the above-described calculated value is stoichiometrically appropriate. This prevents excess cyclohexylbenzene from remaining after refresh charging. However, in the present example, even if excess hexylbenzene remains, the hexylbenzene may still function as an anti-overcharging agent for the lithium ion battery. Thus, the amount of cyclohexylbenzene added corresponded to a mole number equal to the amount of a decrease in battery capacity (in coulombs) divided by 96,500 C (1 faraday). This corresponds to the addition of an amount of cyclohexylbenzene equivalent to the amount of oxidation electricity that is twice to five times as great as the decrease amount. The amount of a decrease in battery capacity was 13,320 coulombs (3.7 Ah), and the addition amount was 0.14 mole.

The thus produced battery had a capacity of 10 Ah. That is, the Qint shown in Expression 1 is 10 Ah. The present system is denoted by S1.

The system S1 was operated such that the lithium ion battery carried out 2,000 charge and discharge cycles at 1 C-rate (10 A). The environmental temperature was 40° C. The capacity of the battery decreased down to 50% of the initial value. Thus, the test was temporarily stopped. Here, the Qtdc in Expression 1 is 5 Ah, and the maximum amount of electricity Qref that can be recharged into the anode is also 5 Ah (Expression 1).

The results of tests in which the model cell was left uncontrolled indicate the self-discharge speed of the cathode used in the example is equal to or lower than one-tenth of that of the anode used in the example. Thus, a control program based on Expression 1 was loaded into the charge and discharge controller 113 to carry out refresh charging as described below.

If the material constitution corresponds to Qcdc>Qadc, a control program based on Expression 3 needs to be used. Thus, to allow new different program to be utilized, an external communication port is provided in the charge and discharge controller 113 so that programs can be rewritten through the external communication port.

Then, the refresh charging according to the present invention was carried out. The switch 111 was actuated, and the charge and discharge controller 113 was used to apply a voltage to between the battery container 101 and the anode terminal 106. The applied voltage was at least 5 V. The voltage was adjusted so as to prevent the current value from being excessively large. The reason for this adjustment is as follows. The flow of an excessive current causes the current to concentrate at a portion of the anode 103 which is close to the battery container 101, that is, the end of the anode 103. Thus, lithium precipitates at the end of the anode 103. The desirable current value is a slow current value at least 0.1 C-rate (1 A). In the present example, the voltage was adjusted such that the current was within the range between 0.5 A and 0.6 A. After the refresh charging, charge and discharge tests at 1 C-rate (10 A) were carried out and the capacity of the battery was measured. As a result, the capacity of the battery was recovered to 8.7 Ah as shown in Table 1.

Example 1-2

Similarly, the effects of the present invention were confirmed in the apparatus 200 shown in FIG. 2. Even though the removable charger 220 was configured to be removable, the same refresh charging as that described above allowed the battery capacity having decreased to 5 Ah to be recovered to 8.7 Ah as shown in Table 1.

Example 1-3

Then, a battery was produced by injecting an electrolytic solution with no cyclohexylbenzene dissolved therein into the battery, and sealing the inlet 108.

The battery was mounted in the system S1, and tests with 2,000 cycles were carried out under a charge and discharge condition specifying 1 C-rate (10 A). The environmental temperature was 40° C. The capacity of the battery decreased down to 50% of the initial value. Thus, the test was temporarily stopped.

The system was transferred to a vessel in a nitrogen atmosphere. The inlet 108 was opened. Then, a small amount of electrolytic solution with cyclohexylbenzene dissolved therein was injected through the inlet 108. In the present example the inlet 108 was then sealed off. The cyclohexylbenzene is one of the sacrificial reducing agents according to the present invention. In the present example, no gas is generated, and thus no problem occurs even when the inlet 108 is closed. The amount of cyclohexylbenzene added was 0.14 mole.

Under the same conditions as those for the above-described refresh charging, a voltage was applied to between the battery container 101 and the anode terminal 106. In the present example the voltage was adjusted such that the current was within the range between 0.5 A and 0.6 A. After the refresh charging, charge and discharge tests at 1 C-rate (10 A) were carried out and the capacity of the battery was measured. As a result, the capacity of the battery was recovered to 8.6 to 8.8 Ah.

Example 1-4

Moreover, three lithium ion batteries were produced into which an electrolytic solution with a sacrificial reducing agent other than cyclohexylbenzene added thereto was injected. The following three types of sacrificial reducing agents were used and added to the different batteries: terphenyl hydride, dibenzofuran hydride, and biphenyl. The amount of the sacrificial reducing agents added was 0.14 mole. Except for the sacrificial reducing agent, battery specifications such as the electrodes, the electrolytic solution, and the battery structure are the same as those for the above-described battery with cyclohexylbenzene added thereto.

The three types of batteries were mounted in the apparatus 100 in FIG. 1. Then, three types of systems S1 were assembled. Each of the systems S1 was operated so as to allow the lithium ion battery to carry out 2,000 charge and discharge cycles at 1 C-rate (10 A). The environmental temperature was 40° C. The capacity of the battery decreased down to 50% of the initial value. Thus, the test was temporarily stopped.

Then, the refresh charging according to the present invention was carried out. The switch 111 was actuated, and the charge and discharge controller 113 was used to apply a voltage to between the battery container 101 and the anode terminal 106. The applied voltage was at least 5 V. The voltage was adjusted so as to prevent the current value from being excessively large. The reason for this adjustment is as follows. The flow of an excessive current causes the current to concentrate at a portion of the anode 103 which is close to the battery container 101, that is, the end of the anode 103. Thus, lithium precipitates at the end of the anode 103. The desirable current value is a slow current value at least 0.1 C-rate (1 A). In the present example, the voltage was adjusted such that the current was within the range between 0.5 A and 0.6 A. After the refresh charging, charge and discharge tests at 1 C-rate (10 A) were carried out and the capacity of the battery was measured. As a result, the capacity of the battery was recovered to 8.5 to 8.8 Ah.

Example 2-1

In the apparatus 100 shown in FIG. 1, an electrolytic solution was prepared by adding an electrolyte $LiPF_6$ to a solvent with ethylene carbonate (hereinafter referred to as EC) and dimethyl carbonate (DMC) mixed together in the volume ratio of 1:1 so that the resultant concentration was 1 mole/liter. The structure of the seal port in the lithium ion battery and the remaining parts of the configuration are the same as those in Example 1 except in that the polymer forming agent (cyclohexylbenzene) is not used. The capacity of the battery was 10 Ah. The system is denoted by S2.

The system S2 was operated so as to allow the lithium ion battery to carry out 2,000 charge and discharge cycles at 1 C-rate (10 A). The environmental temperature was 40° C.

The capacity of the battery decreased down to 50% of the initial value. Thus, the system was transferred to the vessel in the nitrogen atmosphere. The inlet 108 was opened. Then, a sacrificial reducing agent was added through the inlet 108. In the present example, lithium iodate was selected as the sacrificial reducing agent. The amount of the lithium iodate added corresponded to a mole number that is 1.5 times as great as the amount of a decrease in battery capacity (in coulombs) divided by the Faraday constant. It is expected that in an oxidation current resulting from lithium iodate, six electrons migrate per mole. Thus, desirably, reducing the amount to one-sixth of the above-described calculated value is stoichiometrically appropriate. This prevents excess lithium iodate from remaining after refresh charging. However, in the present example, it is assumed that with a stoichiometric amount of lithium iodate, the concentration of the lithium iodate decreases excessively as charging time elapses. Thus, the amount of lithium iodate added to the lithium ion battery was 1.5 times as great as the calculated value (equivalent to one-fourth of the stoichiometric amount).

The required amount of lithium iodate is calculated based on the amount of a decrease in battery capacity (3.7 Ah) as in Example 1 described above. Then, since the amount of a decrease in battery capacity is 13,320 coulombs (3.7 Ah), the amount of lithium iodate added is 0.035 mole.

The refresh charging according to the present invention was carried out. The switch 111 was actuated, and the charge and discharge controller 113 was used to apply a voltage to between the battery container 101 and the anode terminal 106. The applied voltage was at least 5 V. The voltage was adjusted so as to prevent the current value from being excessively large. The reason for this adjustment is as follows. The flow of an excessive current causes the current to concentrate at a portion of the anode 103 which is close to the battery container 101, that is, the end of the anode 103. Thus, lithium precipitates at the end of the anode 103. The desirable current value is a slow current value at least 0.1 C-rate (1 A). In the present example, the voltage was adjusted such that the current was within the range between 0.5 A and 0.6 A. After the refresh charging was finished, the inlet 108 was sealed off.

If a safety valve is installed in the lithium ion battery and the value of an increase in internal pressure caused by gas generated during the refresh charging is smaller than that of the operating pressure of the safety valve, the inlet 108 may be closed before the refresh charging.

After the refresh charging, charge and discharge tests at 1 C-rate (10 A) were carried out and the capacity of the battery was measured. As a result, the capacity of the battery was recovered to 8.5 Ah as shown in Table 1.

Example 2-2

Similarly, the effects of the present invention were confirmed in the apparatus 200 shown in FIG. 2. Even though the removable charger 220 was configured to be removable, the same refresh charging as that described above allowed the battery capacity having decreased to 5 Ah to be recovered to 8.5 Ah as shown in Table 1.

Example 3-1

In the apparatus 100 shown in FIG. 1, an electrolytic solution was prepared by adding an electrolyte $LiPF_6$ to a solvent with ethylene carbonate (hereinafter referred to as EC) and dimethyl carbonate (DMC) mixed together in the volume ratio of 1:1 so that the resultant concentration was 1 mole/liter. In the present example, lithium oxalate was used instead of the polymer forming agent (cyclohexylbenzene) in Example 1 or the sacrificial reducing agent (lithium iodate) in Example 2. Except for this, the structure of the seal port and the remaining parts of the configuration are the same as those in Example 1. The capacity of the battery was 10 Ah. The system is denoted by S3.

The system S3 was operated so as to allow the lithium ion battery to carry out 2,000 charge and discharge cycles at 1 C-rate (10 A). The environmental temperature was 40° C.

The capacity of the battery decreased down to 50% of the initial value. Thus, the system was transferred to the vessel in the nitrogen atmosphere. The inlet 108 was opened. Then, a sacrificial reducing agent was added through the inlet 108. In the present example, lithium oxalate was selected as the sacrificial reducing agent. The amount of the lithium oxalate added corresponded to a mole number that is 1.5 times as great as the amount of a decrease in battery capacity (in coulombs) divided by the Faraday constant. It is expected that in an oxidation current resulting from lithium oxalate, two electrons migrate per mole. Thus, desirably, reducing the amount to half of the above-described calculated value is stoichiometrically appropriate. This prevents excess lithium oxalate from remaining after refresh charging. However, in the present example, it is assumed that with a stoichiometric amount of lithium oxalate, the concentration of the lithium oxalate decreases excessively as the charging time elapses. Thus, the amount of lithium oxalate added to the lithium ion battery was 1.5 times as great as the calculated value (equivalent to three-fourths of the stoichiometric amount).

The required amount of lithium oxalate is calculated based on the amount of a decrease in battery capacity (3.7 Ah) as in Example 1 described above. Then, since the amount of a decrease in battery capacity is 13,320 coulombs (3.7 Ah), the amount of lithium oxalate added is 0.10 mole.

The refresh charging according to the present invention was carried out. The switch 111 was actuated, and the charge and discharge controller 113 was used to apply a voltage to between the battery container 101 and the anode terminal 106. The applied voltage was at least 5 V. The voltage was adjusted so as to prevent the current value from being excessively large. The reason for this adjustment is as follows. The flow of an excessive current causes the current to concentrate at a portion of the anode 103 which is close to the battery container 101, that is, the end of the anode 103. Thus, lithium precipitates at the end of the anode 103. The desirable current value is a slow current value at least 0.1 C-rate (1 A). In the present example, the voltage was adjusted such that the current was within the range between 0.5 A and 0.6 A. After the refresh charging was finished, the inlet 108 was sealed off.

If a safety valve is installed in the lithium ion battery and the value of an increase in internal pressure caused by gas generated during the refresh charging is smaller than that of the operating pressure of the safety valve, the inlet 108 may be closed before the refresh charging.

After the refresh charging, charge and discharge tests at 1 C-rate (10 A) were carried out and the capacity of the battery was measured. As a result, the capacity of the battery was recovered to 8.9 Ah as shown in table 1.

Example 3-2

Similarly, the effects of the present invention were confirmed in the configuration shown in FIG. 2. Even though the charger 220 was configured to be removable, the same refresh charging as that described above allowed the battery capacity having decreased to 5 Ah to be recovered to 8.9 Ah as shown in Table 1.

TABLE 1

| System | Capacity before refresh (Ah) | Capacity after refresh (Ah) |
|---|---|---|
| S1 | 5 | 8.7 |
| S2 | 5 | 8.5 |
| S3 | 5 | 8.9 |

Example 4-1

In the apparatus 100 shown in FIG. 1, an electrolytic solution was prepared by adding an electrolyte $LiPF_6$ to a solvent with ethylene carbonate (hereinafter referred to as EC) and dimethyl carbonate (DMC) mixed together in the volume ratio of 1:1 so that the resultant concentration was 1 mole/liter. In the present example, none of the following were used: the polymer forming agent (cyclohexylbenzene) in Example 1, the sacrificial reducing agent (lithium iodate) in Example 2, and the sacrificial reducing agent (lithium oxalate) in Example 3, and whether or not an oxide film was generated on the inner wall of the battery container 201 was determined. Except for this, the structure of the seal port and the remaining parts of the configuration are the same as those in Example 1.

The system was operated so as to allow the lithium ion battery to carry out 2,000 charge and discharge cycles at 1 C-rate (10 A). The environmental temperature was 40° C.

The refresh charging according to the present invention was carried out. The switch 111 was actuated, and the charge and discharge controller 113 was used to apply a voltage to between the battery container 101 and the anode terminal 106. The applied voltage was at least 5 V. The voltage was adjusted so as to prevent the current value from being excessively large. The reason for this adjustment is as follows. The flow of an excessive current causes the current to concentrate at a portion of the anode 103 which is close to the battery container 101, that is, the end of the anode 103. Thus, lithium precipitates at the end of the anode 103. The desirable current value is a slow current value at least 0.1 C-rate (1 A). In the present example, the voltage was adjusted such that the current was within the range between 0.5 A and 0.6 A. After the refresh charging was finished, the system was transferred to the vessel in the nitrogen atmosphere. The system was then dismantled. The inner wall of a part of the taken-out battery container was subjected to surface analysis by X-ray diffraction. Electron spectroscopy, Auger electron spectroscopy, or the like may be used for the surface analysis.

The results of the analysis indicate that an oxide film was generated on the inner wall of the battery container. This is assumed to be because oxygen ions resulting from decomposition of the cathode and the solvent were fed to the inner wall of the aluminum battery container.

Example 4-2

The sacrificial reducing agent (lithium oxalate) used in Example 3 was added to the electrolytic solution, and the same refresh charging as that in Example 4-1 was carried out. Then, as in the case of Example 4-1, the inner wall of a part of the taken-out battery container was subjected to surface analysis by X-ray diffraction. The results of the analysis indicate that the oxide film on the inner wall of the battery container had grown thicker.

What is claimed is:

1. A nonaqueous electrolyte secondary battery apparatus comprising a cathode, an anode, and a nonaqueous electrolytic solution comprising a nonaqueous electrolyte, a cathode terminal being connected to the cathode, an anode terminal being connected to the anode, the cathode terminal and the anode terminal being attached to a battery container via insulating components, wherein a first charging circuit providing a function to apply a voltage to the cathode terminal and the anode terminal is connected to the cathode terminal and the anode terminal, and a second charging circuit providing a function to apply a voltage to the battery container and the anode terminal is connected to the battery container and the anode terminal, and wherein the nonaqueous electrolytic solution comprises a sacrificial reducing agent, and the second charging circuit enables a voltage equal to or greater than a voltage at which the sacrificial reducing agent is oxidized on the battery container to be applied to between the anode and the battery container.

2. The nonaqueous electrolyte secondary battery apparatus according to claim 1, wherein the second charging circuit is removable.

3. The nonaqueous electrolyte secondary battery apparatus according to claim 1, wherein the sacrificial reducing agent that causes oxidation polymerization reaction or gas generation reaction is used as the sacrificial reducing agent.

4. The nonaqueous electrolyte secondary battery apparatus according to any one of claims 1 and 2, wherein the nonaqueous electrolyte secondary battery apparatus is a lithium ion battery.

5. A method for charging an anode of a nonaqueous electrolyte secondary battery comprising a cathode, the anode, and a nonaqueous electrolytic solution comprising a nonaqueous electrolyte, a cathode terminal being connected to the cathode, an anode terminal being connected to the anode, the cathode terminal and the anode terminal being attached to a battery container via insulating components, the battery comprising a first charging circuit providing a function to apply a voltage to the cathode terminal and the anode terminal and connected to the cathode terminal and the anode terminal, and a second charging circuit providing a function to apply a voltage to the battery container and the anode terminal and connected to the battery container and the anode terminal, the second charging circuit applying the voltage to between the battery container and the anode terminal to charge the anode, wherein the nonaqueous electrolytic solution comprises a sacrificial reducing agent, and the second charging circuit enables a voltage equal to or greater than a voltage at which the sacrificial reducing agent is oxidized on the battery container to be applied to between the anode and the battery container.

6. The method according to claim 5, wherein the nonaqueous electrolyte secondary battery is a lithium ion battery.

* * * * *